US012623935B2

United States Patent

(12) United States Patent
Yang et al.

(10) Patent No.: US 12,623,935 B2
(45) Date of Patent: May 12, 2026

(54) PRODUCED WATER ANTIFOULANT COMPOSITIONS AND METHODS

(71) Applicant: ChampionX LLC, Sugar Land, TX (US)

(72) Inventors: Dingzheng Yang, Edmonton (CA); Ali Faghihnejad, Edmonton (CA); Song Gao, Sherwood Park (CA)

(73) Assignee: ChampionX LLC, Sugar Land, TX (US)

( * ) Notice: Subject to any disclaimer, the term of this patent is extended or adjusted under 35 U.S.C. 154(b) by 421 days.

(21) Appl. No.: 18/472,058

(22) Filed: Sep. 21, 2023

(65) Prior Publication Data

US 2024/0116787 A1 Apr. 11, 2024

Related U.S. Application Data

(60) Provisional application No. 63/376,564, filed on Sep. 21, 2022.

(51) Int. Cl.
*C02F 1/68* (2023.01)
*C02F 101/32* (2006.01)

(52) U.S. Cl.
CPC .......... *C02F 1/681* (2013.01); *C02F 2101/32* (2013.01); *C02F 2303/20* (2013.01); *C02F 2305/00* (2013.01)

(58) Field of Classification Search
CPC .. C02F 1/681; C02F 2101/32; C02F 2303/20; C02F 2305/00; C09K 8/524
See application file for complete search history.

(56) References Cited

U.S. PATENT DOCUMENTS

| | | | |
|---|---|---|---|
| 4,024,051 | A | 5/1977 | Shell et al. |
| 4,529,500 | A | 7/1985 | Miller et al. |
| 4,900,427 | A | 2/1990 | Weers et al. |
| 6,077,888 | A | 6/2000 | Schilling |
| 2008/0028979 | A1 | 2/2008 | Stark et al. |
| 2020/0024503 | A1 | 1/2020 | Watters et al. |

FOREIGN PATENT DOCUMENTS

| | | | | |
|---|---|---|---|---|
| WO | WO-0042140 | A1 * | 7/2000 | .............. C11D 1/44 |
| WO | 2018/058089 | A2 | 3/2018 | |
| WO | 2019/213687 | A1 | 11/2019 | |

OTHER PUBLICATIONS

International Search Report and Written Opinion dated Jan. 16, 2024 relating to PCT/US2023/033357, 13 pages.

* cited by examiner

*Primary Examiner* — Dirk R Bass
(74) *Attorney, Agent, or Firm* — Stinson LLP

(57) ABSTRACT

A water treatment composition is disclosed herein comprising a nonylphenol resin and a polyethoxylated tallow amine.

11 Claims, 1 Drawing Sheet

PRODUCED WATER ANTIFOULANT COMPOSITIONS AND METHODS

CROSS REFERENCE TO RELATED APPLICATIONS

This patent application claims the benefit of U.S. Provisional Patent Application No. 63/376,564, filed Sep. 21, 2022; the entire disclosure of which is incorporated herein by reference.

FIELD

The present disclosure relates generally to water treatment compositions. More specifically, fouling inhibiting compositions herein may comprise novel combinations of phenol-based groups.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Produced water cooler (PWC) and boiler fouling has been an issue for years with water treatment processes. In environments such as Canadian oil sands and heavy oil facilities, the remediation of fouling may be costly for oil producers.

Generally, PWC's have been widely used to cool down the water generated from high temperature oil/water phase separators in Canadian oil sands operations, including steam-assisted gravity drainage (SAGD) and thermal operations, for example. While the high temperature produced water (e.g., 120-140° C.) are cooled by passing through the PWC, soluble organic matters (SOM) in the produced water may precipitate and deposit onto the PWC surface. At times, the foulant can partially block the heat exchanger flow pass causing increasing operating pressure, and formation of an organic layer on the PWC inner surface to reduce its heat transfer efficiency.

A combination of thermal, mechanical and chemical cleaning methods may be used to remediate the PWC fouling issue to return the PWC back to its operational state. The cost for PWC regular remediation may be relatively high, so there may be significant needs for developing new antifoulant chemicals that can extend the run time of the PWC and save the operating cost for oil producers. For at least the foregoing reasons, there is a need in the industry for efficient methods and compositions for water treatment, such as reducing or preventing water fouling.

BRIEF SUMMARY

Various compositions and methods are disclosed herein including a water treatment compositions comprising a nonylphenol resin; and a polyethoxylated tallow amine.

Another aspect of the disclosure is a water treatment composition for an oilfield application, the composition comprising an oxyalkylated resin having a molecular structure:

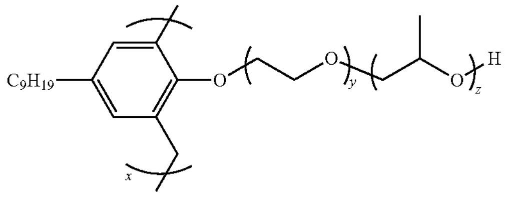

wherein x=5-6; y=6 or 9; and z=0 or 1.

Another aspect of the disclosure is a method of reducing water fouling in an oilfield application, the method comprising contacting water with a composition comprising an oxyalkylated resin having a molecular structure:

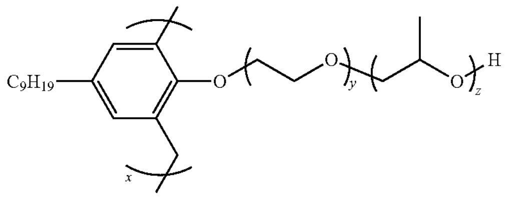

wherein x=5-6; y=6 or 9; and z=0 or 1.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
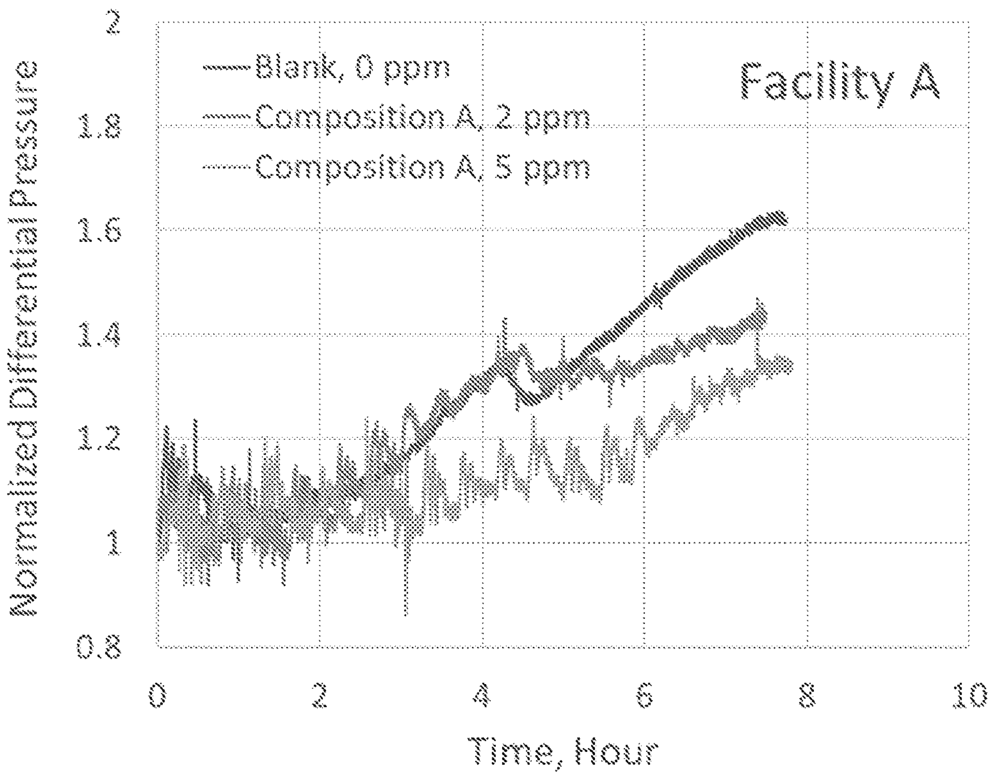
FIG. 1 depicts a graph of the time in hours versus normalized differential pressure for 2 ppm and 5 ppm of Composition A.
Figure 2:
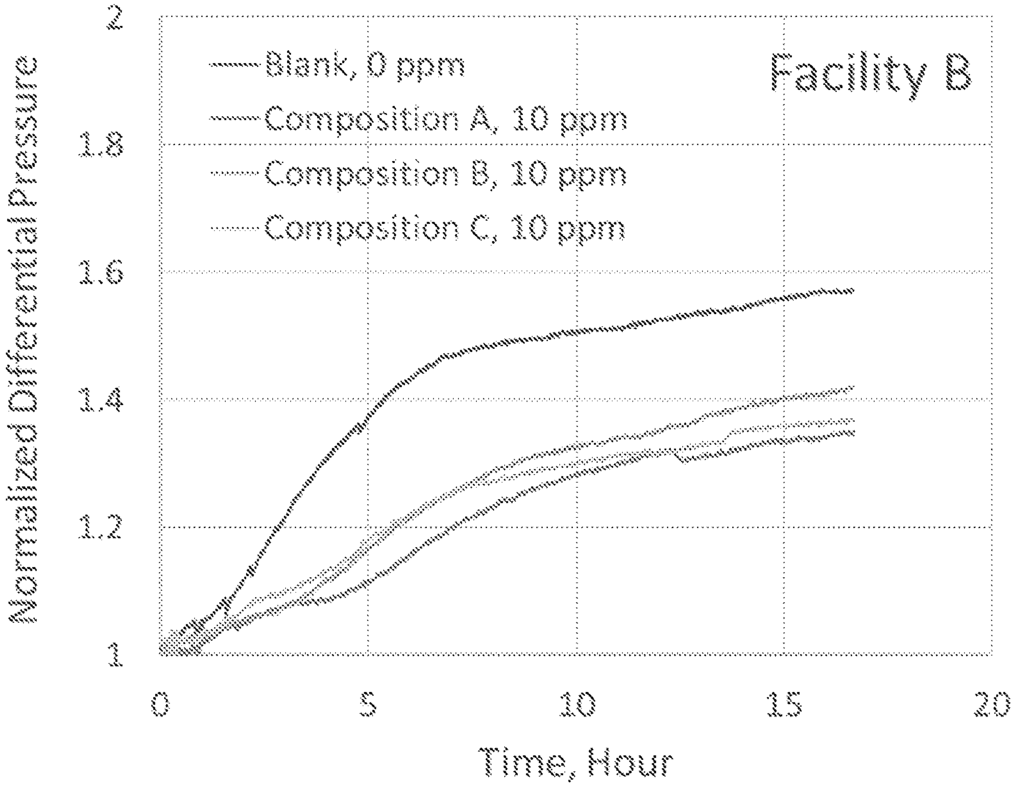
FIG. 2 depicts a graph of the time in hours versus normalized differential pressure for 10 ppm of Composition A, Composition B, and Composition C.

Although the present disclosure provides references to preferred embodiments, persons skilled in the art will recognize that changes may be made in form and detail without departing from the spirit and scope of the disclosure. Additionally, any examples set forth in this specification are not intended to be limiting and merely set forth some of the many possible embodiments for the appended claims.

Various specific embodiments and versions of the present disclosure will now be described, including preferred embodiments and definitions that are adopted herein. While the following detailed description gives specific preferred embodiments, those skilled in the art will appreciate that these embodiments are exemplary only, and that the present disclosure can be practiced in other ways.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, a "polymer" may refer to homopolymers, copolymers, interpolymers, terpolymers, or the like. As used herein, when a polymer is referred to as comprising a monomer, the monomer may be present in the polymer in the polymerized form of the monomer or in the derivative form of the monomer. Further, as used herein, the term "copolymer" is meant to include polymers having two or more monomers, optionally with other monomers, and may refer to interpolymers, terpolymers, and the like.

As used herein, "aqueous system" may include any system containing water, including but not limited to, produced water, cooling water, boiler water, desalination, gas scrubbers, blast furnaces, reverse osmosis, upstream and midstream oil and gas applications, and the like.

The present disclosure relates to compositions used to treat the accumulation or unwanted material/deposits in water or on a component (e.g., oilfield equipment, heating elements, etc.). Further, compositions, methods, equipment, and/or components herein may be for oilfield applications, including but not limited to water treatment, antifoulant, deposit inhibition, emulsifiers, anti-flocculants, anti-agglomerants, and clarifiers.

Examples of such fouling or deposits include, but are not limited to, scale, corrosion, microorganisms or plant life in the case of bio-fouling, metals including dissolved metals, dirt, and debris. Other examples of deposits may comprise polymerization products, inorganic deposits, silica, iron-oxides, iron sulfides, calcium oxide, magnesium oxide, inorganic chloride salts, sodium oxide, alumina, sodium sulfate, copper oxides, copper salts, and the like.

Water treatment, including antifoulant mixtures have been developed to extend the runtime by using an in-house built high temperature simulation unit which can measure the pressure drop variation across PWC/boiler caused by various antifoulants. In addition, antifoulant mixtures include alkylated phenol and alkoxylate phenols with various structures and molar ratios of alkyl and alkoxyl functional groups.

Compositions herein may comprise an EO-PO nonylphenol resin, an alkylated phenol, alkoxylated phenol, and the like, to provide enhanced antifouling protection for equipment including water coolers or boilers.

Further, compositions herein may comprise an alkyl amine surfactant. In embodiments, such alkyl amine surfactant, organic sulfonate salt may be an ethoxylated tallow amine including but not limited to amines, tallow alkyl, ethoxylated, 4-dodecylbenzenesulfonates (salts) or tallow amine, ethoxylated, dodecyl benzenesulfonate, salt. In some embodiments, ethoxylated tallow amines herein may have a molecular structure:

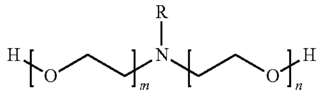

Wherein m=9-11 and n=9-11. Such salt(s) may further comprise a sulfonate group including but not limited to:

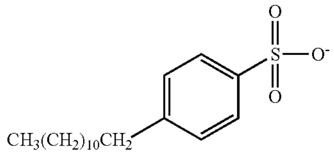

Compositions herein may further comprise other components including, but not limited to, metal hydroxides.

Methods may involve contacting produced water from a wellbore with antifoulant compositions disclosed herein. Such methods may involve the step of heating such mixtures to temperatures up to about 170° C. The heating may be conducted in the presence of previously fouled oilfield equipment, practiced sequentially or simultaneously.

In various oilfield processes, fouling deposits may occur on equipment and heat exchange surfaces at varying temperatures, including about 200° F. through 900° F. Such fouling deposits may be polymerization products characterized by gummy texture and black color, having inorganic portions containing inorganic salts (e.g., chloride salts), silica, metal oxides, metal sulfides, metal salts, alumina, and the like. These deposits are typically not readily solubilized by common organic solvents. Generally, conventional antioxidants or stabilizing chemicals have been shown to be ineffective as antifoulants.

The oxyalkylated resin herein may comprise nonylphenol ether of the ethylene oxide and propylene oxide (EO-PO) copolymer, nonyl phenyl ether copolymer of EO-PO, Phenol resins herein may comprise nonylphenol, including nonylphenol ethylene oxide and nonylphenol propylene oxide, or the like.

Solvent systems contemplated for the disclosed compositions include water, methanol, aromatic hydrocarbon, alkylene glycol, petroleum distillates, for example.

To reduce fouling deposits and/or suppress fouling material, additive compounds, such as an admixture of polymer A and polymer B, herein may be present in a total mixture ranging from about 0 to 100 ppm by wt %] to another range of about 100 to 0 ppm by wt %. For example, the mixture may comprise a range of 100 to 10 weight percent A to from 10 to 100 weight percent B, wherein polymer A is an alkyl substituted phenol-formaldehyde liquid resin having a weight average molecular weight ranging from about 1000 to about 20,000, and an alkyl substituent containing from about 4 to 24 carbon atoms; wherein the alkyl substituent may be a linear or branched alkyl group and polymer B is a hydrophillic-lipophilic vinylic polymer. Those of ordinary skill in the art contemplate utilizing smaller and larger amounts of such additive compounds. Conventional means of mixing and/or heating may be employed when combining additives.

In embodiments, compositions herein may be used to reduce and/or inhibit fouling, precipitation, or the build-up of deposits in or on equipment designed to be in contact with petroleum, water, or other fluids, including but not limited to a water cooler or water boiler. These treatments may occur at temperatures up to about 170° C., however the typical temperature of treatment is from about 120° C. to 140° C.

In embodiments, water treatment compositions may comprise from about 80 to 90 weight percent oxyalkylated resin. Such nonylphenol compositions may comprise from about 10 to 18 weight percent hydrocarbons, including naphthalene, for example. Further, such compositions may comprise from about 0.001 to 0.250 weight percent metal hydroxide, including potassium hydroxide, for example.

In other embodiments, water treatment compositions may comprise from about 10 to 20 weight percent oxyalkylated resin and from about 20 to 30 weight percent polyethoxylated tallow amine. In such water treatment compositions, the weight ratio of the oxyalkylated resin (e.g., ethoxylated (EO) nonylphenol) to the polyethoxylated tallow amine is about 1:2.

Methods of manufacturing compositions has been disclosed from prior art, and described as below. The synthesis procedure begins with the preparation of phenolic resins by the acid catalyzed condensation of a para-alkyl phenol (preferably p-nonylphenol or tert-butyl phenol), and an aldehyde (preferably, paraformaldehyde or formaline). Ethylene oxide, propylene oxide, and mixed oxides with the weight percentage between 10 and 80 percent can be added into the phenolic resins to form various derivative of phenolic resins.

Although water coolers and boilers are mentioned herein, disclosed compositions may be applied to equipment, such as oilfield equipment, and components including but not limited to, pumps or vacuum pumps, compressors, fans, impellers, valves, heat exchangers, sensors, and the like, which may be subject to fouling.

EXAMPLES

Exemplary compositions herein may comprise:

Composition A

| Wt % | Component |
|---|---|
| 40-55% | Aliphatic alcohol |
| 28-35% | Oxyalkylated resin A |
| 8-15% | Oxyalkylated resin B |
| 5-10% | Petroleum distillates |

Composition B

| Wt % | Component |
|---|---|
| 40-55% | Oxyalkylated resin |
| 10-18% | Aromatic hydrocarbon A |
| 10-18% | Aromatic hydrocarbon B |
| 5-10% | Aromatic solvent |

Composition C

| Wt % | Component |
|---|---|
| 30-35% | Aromatic solvent |
| 20-30% | Tallow amine |

-continued

| Wt % | Component |
|---|---|
| 10-20% | Aliphatic alcohol |
| 10-15% | Oxyalkylated resin |

Compositions A, B, and C exhibited improved antifouling performance, including showing lower maximum differential pressure (dP), as compared to a blank.

In the previous sections, specific embodiments of the present disclosure are described in connection with disclosed aspects and methods. However, to the extent the description is specific to a particular aspect, technique, or particular use, this is intended to be for exemplary purposes only. Accordingly, the present disclosure is not limited to the disclosed aspects and techniques described above, but rather includes all alternatives, embodiments, modifications, and equivalents falling within the spirit and scope of claims that follow.

While the present disclosure has been described and illustrated by reference to particular embodiments, those of ordinary skill in the art will appreciate that the disclosure leads itself to variations not necessary illustrated herein. For this reason, reference should be made solely to the claims below for purposes of determining the true scope of the invention.

What is claimed is:

1. A water treatment composition comprising:

a nonylphenol resin; and a polyethoxylated tallow amine, wherein the nonylphenol resin comprises a structure:

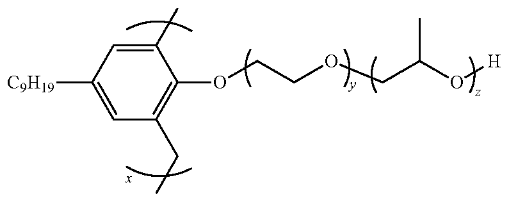

wherein x=5-6;

y=6 or 9; and z=0 or 1; and wherein the polyethoxylated tallow amine comprises an ethyoxylated, dodecyl benzenesulfonate tallow amine salt.

2. The composition of claim 1, wherein the nonylphenol resin comprises ethylene oxide, propylene oxide, or a combination thereof.

3. A water treatment composition for an oilfield application, the composition comprising an oxyalkylated resin having a molecular structure:

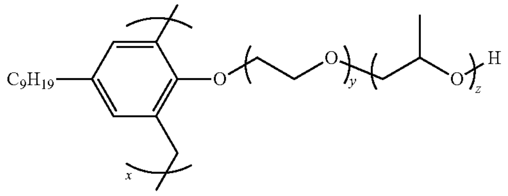

wherein x=5-6;

y=6 or 9; and z=0 or 1; and a polyethoxylated tallow amine comprising an ethyoxylated, dodecyl benzenesulfonate tallow amine salt.

4. The composition of claim 3, wherein the oxyalkylated resin comprises a nonylphenol group.

5. The composition of 3, wherein a weight ratio of a nonylphenol ether copolymer of ethylene oxide and propylene oxide (EO-PO) to an ethoxylated (EO) nonylphenol is about 3:1.

6. The composition of claim 5, wherein a weight ratio of the ethoxylated (EO) nonylphenol to the polyethoxylated tallow amine is about 1:2.

7. The composition of claim 3, wherein the oilfield application comprises water treatment, antifouling, deposit inhibition, emulsifying, anti-flocculation, anti-agglomeration, clarification, or a combination thereof.

8. A method of reducing water fouling in an oilfield application, the method comprising contacting water with a composition comprising an oxyalkylated resin having a molecular structure:

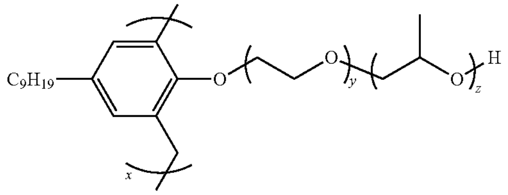

wherein X=5-6;

y=6 or 9; and z=0 or 1; and a polyethoxylated tallow amine comprising an ethyoxylated, dodecyl benzenesulfonate tallow amine salt.

9. The composition of claim 8, wherein a weight ratio of a nonylphenol ether copolymer of ethylene oxide and propylene oxide (EO-PO) to an ethoxylated (EO) nonylphenol is about 3:1.

10. The composition of claim 8, wherein a weight ratio of the ethoxylated (EO) nonylphenol to the polyethoxylated tallow amine is about 1:2.

11. The composition of claim 8, wherein the oilfield application comprises water treatment, antifouling, deposit inhibition, emulsifying, anti-flocculation, anti-agglomeration, clarification, or a combination thereof.

* * * * *